Figure 1:
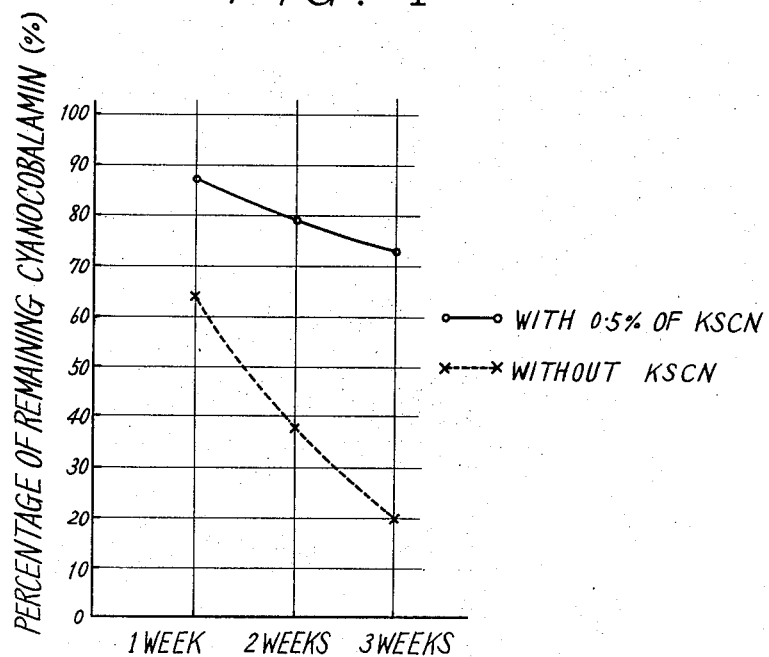

United States Patent Office 2,959,520
Patented Nov. 8, 1960

2,959,520
STABILIZED AQUEOUS SOLUTION OF VITAMIN B COMPLEX CONTAINING CYANOCOBALAMIN AND THIOCYANATES

Seizo Kawajiri, Osaka, Japan, assignor to Takeda Pharmaceutical Industries, Ltd., Osaka, Japan Filed Apr. 6, 1959, Ser. No. 804,447
Claims priority, application Japan Apr. 7, 1958
8 Claims. (Cl. 167—81)

This invention relates to stabilized aqueous solutions containing cyanocobalamin.

Several kinds of liquid preparations containing vitamin B complex are being sold as medicines for injection, oral administration or the like. According to recent reports of some researchers in this field, the stability of cyanocobalamin in such preparations is very low and especially so when it is present together with both thiamine and niacinamide.

In general the pH range of aqueous preparations of vitamin B complex is 4.0–4.5. This pH range seems to be suitable for dissolving cyanocobalamin and keeping the solution stable in consideration of properties of the substance. The stability of cyanocobalamin, however, is lowered when it is placed together with thiamine and niacinamide. This tendency is stimulated if the concentration of components in the preparations is high or if the preparations are heated. The decomposition of cyanocobalamin under the above conditions is deemed to be due to the existence of certain decomposition products of the thiamine in the preparations. According to S. L. Mukherjee, ferric ion can inhibit the decomposition of cyanocobalamin existing with both thiamine and niacinamide (see Journal of Pharmacy and Pharmacology, vol. 9, p. 759 (1957)). In liquid preparations of vitamin B complex, however, ferric ion changes their appearance even if the concentration of the ion is very low, and therefore it is not useful in medicines, constancy in the appearance of which is desired.

A primary object of the present invention is the embodiment of vitamin B complex preparations which contain both thiamine and niacinamide in addition to cyanocobalamin and which are highly resistant to decomposition, while being free of the prior art disadvantage of discoloration.

This object is realized, briefly stated, by the incorporation into the said preparations, of a water-soluble alkali metal thiocyanate. This added thiocyanate according to the present invention, stabilizes aqueous preparations containing cyanocobalamin, thiamine and niacinamide. This stabilization action appears to involve inactivation of decomposition products of the co-present thiamine and niacinamide which have a decomposing action on cyanocobalamin. It has further been found that the alkali metal thiocyanates also inhibit decomposition of cyanocobalamin by heat and/or by light in aqueous preparations also containing both thiamine and cyanocobalamin.

Briefly stated, the invention may therefore be said to relate to aqueous solutions of vitamin B complex containing at least cyanocobalamin, thiamine, niacinamide and a water-soluble alkali metal thiocyanate.

The aqueous preparations of vitamin B complex, according to the invention, may further contain riboflavin monophosphate, pyridoxine, pantothenyl alcohol, pantothenic acid or a salt thereof and other members of the vitamin B group. Moreover, one or more of correctives, flavors, etc. may be added as long as they have no substantial influence on the preparations. If the preparations are used for injection, they may be made non-irritating by the addition of for example benzyl alcohol.

Following are concrete examples and figures showing the stabilizing effect of the alkali metal thiocyanates in preparations according to the invention. Percentages are by weight.

When an aqueous solution of pH 4.3 containing 5% of thiamine hydrochloride, 5% of niacinamide, and 0.01% of cyanocobalamin is kept at a temperature of 40° C., the cyanocobalamin shows the "remaining ratio" shown in Table 1 and Fig. 1. That is, the ratio becomes about 20% three weeks after the start of the examination. On the other hand, if 0.5% of potassium thiocyanate is added to the solution, about 72% of the cyanocobalamin remains in the solution under the same conditions as above.

TABLE 1

|  | After 1 week | After 2 weeks | After 3 weeks |
|---|---|---|---|
|  | Percent | Percent | Percent |
| With 0.5% of KSCN | 87 | 79 | 73 |
| Without KSCN | 64 | 38 | 20 |

When the same solution as above is exposed to direct sunlight for 3 hours, about 50% of the cyanocobalamin is decomposed when the solution contains no potassium thiocyanate, while about 86% of the cyanocobalamin remains in the solution when the solution contains potassium thiocyanate. From this result it is clear that potassium thiocyanate also prevents cyanocobalamin from being decomposed by heat and sunlight.

Figure 2:
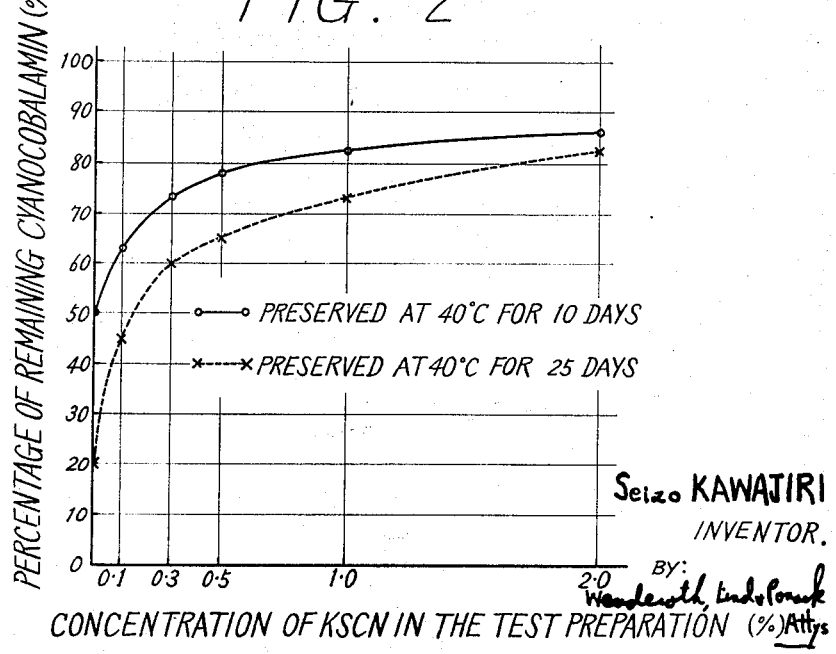

When an aqueous solution containing 5% of thiamine hydrochloride, 5% of niacinamide, 0.01% of cyanocobalamin, 1% of benzyl alcohol, and 0.1–2.0% of potassium thiocyanate is kept at 40° C., the relationship between the concentration of the potassium thiocyanate and the remaining ratio of the cyanocobalamin is as shown in Table 2 and Fig. 2. As is evident from the figure the stabilizing effect of potassium thiocyanate is clear at such a low concentration as 0.1%, although improved effects are exhibited at concentrations of over 0.5%.

TABLE 2

| KSCN percent | 0 | 0.1 | 0.3 | 0.5 | 1.0 | 2.0 |
|---|---|---|---|---|---|---|
| Preservation condition: |  |  |  |  |  |  |
| 40° C., 10 days percent | 50 | 64 | 73 | 78 | 82 | 86 |
| 40° C., 25 days do | 20 | 45 | 60 | 65 | 73 | 83 |

Figure 3:
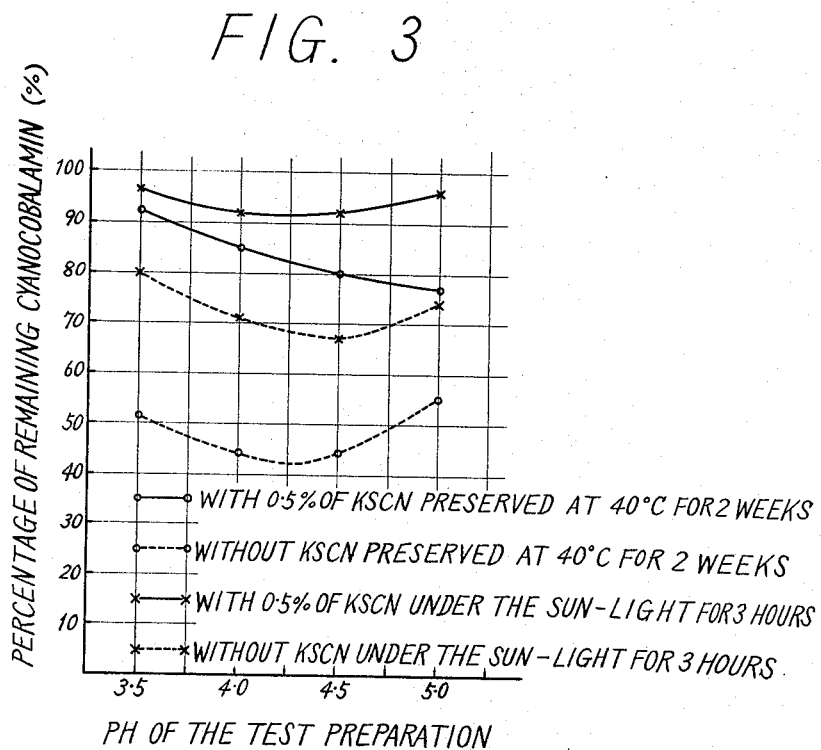

Most liquid preparations of vitamin B complex have a pH between 4.0 and 4.5, but the present invention extends to such preparations in a wider range of pH, i.e. 3.5–5.0. The relationship between the pH and the stability of cyanocobalamin in an aqueous solution containing 5% of thiamine hydrochloride, 5% of niacinamide, 0.01% of cyanocobalamin, 1% of benzyl alcohol, and 0.5% of potassium thiocyanate can be observed in the following two ways: (1) the solution is kept standing at a temperature of 40° C. for two weeks, and (2) the solution is allowed to stand in direct sunlight for 3 hours. As is evident from the results shown in Table 3 and Fig. 3 the effect of e.g. potassium thiocyanate is almost constant within the said range of pH.

TABLE 3

| Preservation conditions | Concentration of KSCN, percent | pH 3.5, percent | pH 4.0, percent | pH 4.5, percent | pH 5.0, percent |
|---|---|---|---|---|---|
| 40° C., 2 weeks | 0.5 | 92 | 85 | 80 | 77 |
| Do |  | 51 | 44 | 44 | 55 |
| In direct sunlight, 3 hours | 0.5 | 96.5 | 92 | 92 | 96 |
| Do |  | 80 | 71 | 67 | 74 |

In the foregoing, only potassium thiocyanate has been cited as a stabilizer but other water-soluble alkaline thiocyanates such as ammonium thiocyanate or sodium thiocyanate exhibit a similar effect on the stabilization of cyanocobalamin in an aqueous preparation of vitamin B complex containing thiamine and niacinamide.

Thus the alkaline thiocyanates are effective stabilizers of cyanocobalamin in liquid preparations of vitamin B complex, and they neither lower the stability nor weaken the medicinal effect of the other components, and moreover they never change the appearance of the preparations.

Unlike cyanides, however, the thiocyanates can not prevent cyanocobalamin from being decomposed by ascorbic acid, and therefore they can not be applied to preparations containing ascorbic acid. As the effective amount of the alkaline thiocyanates involved is very small, preparations containing them are usable as medicines without taking their toxicity into consideration. Therefore, the present invention may widely be applied to preparations of vitamin B complex for both injection and internal administration.

The following examples illustrate presently-preferred embodiments of stabilized preparations of this invention, but these are intended to be wholly exemplary and not at all to limit the scope of this invention.

*Example 1*

Preparation for injection:

| Cyanocobalamin | $\gamma$/cc | 5 |
|---|---|---|
| Thiamine hydrochloride | mg./cc | 50 |
| Niacinamide | mg./cc | 50 |
| Riboflavin monophosphate | mg./cc | 1 |
| Pyridoxine hydrochloride | mg./cc | 5 |
| Pantothenyl alcohol | mg./cc | 5 |
| Benzyl alcohol | weight percent | 1 |
| Potassium thiocyanate | mg./cc | 5 |

An aqueous solution containing the above is aseptically filtered and is filled into ampuls or vials. This preparation has a pH of 4.25.

The potassium thiocyanate in the foregoing recipe may be replaced by an equivalent amount (5 mg./cc.) of sodium thiocyanate, NaCNS.

*Example 2*

Preparation for internal administration:

| Cyanocobalamin | $\gamma$/cc | 2.5 |
|---|---|---|
| Thiamine hydrochloride | mg./cc | 10.0 |
| Niacinamide | mg./cc | 10.0 |
| Calcium pantothenate | mg./cc | 1.6 |
| Pyridoxine hydrochloride | mg./cc | 1.0 |
| Glycerin | cc./cc | 0.2 |
| Correctives and flavors | optimum dosis | |
| Ammonium thiocyanate | mg./cc | 1.0 |

An aqueous solution containing the above is adjusted to pH 4.2 with diluted hydrochloric acid.

In the examples, $\gamma$/cc.=gammas per cubic centimeter; mg./cc.=milligrams per cubic centimeter; cc./cc.=cubic centimeter per cubic centimeter.

The contents of cyanocobalamin, thiamine and niacinamide in each cubic centimeter of the aqueous solution of this invention may vary between 5 and 30 gammas, between 10 and 100 milligrams and between 50 and 100 milligrams, respectively in usual uses. When pyridoxine hydrochloride and pantothenol (or pantothenates) are dissolved in the aqueous solution of this invention, the respective contents thereof may usually be selected between 1 and 5 milligrams and between 1 and 5 milligrams in each cubic centimeter. The above mentioned ranges, however, may conveniently be widened depending on the purposes for use. And, the flavors, correctives or the like usable in the aqueous solution of this invention may be selected from fruit essences such as orange or cherry essence, glycerin, cane sugar and wine, for instance.

The aqueous solution of this invention contains a non-toxic amount of alkaline thiocyanate. Concretely, the amount is not higher than 20 milligrams per cubic centimeter, and the effective dosis is not less than 1 milligram per cubic centimeter. The toxicity of the preparation of Example 1 has no significant difference from that of the preparation including no thiocyanate, when they are examined by intravenous administration to mice.

The aqueous solution of this invention can be used for the very same purposes as those of the known vitamin B complex preparations, namely, as a nutritional factor, for the treatment of neuritis, beriberi, general lassitude, edema, etc., or as a therapeutic adjuvant in febrile state of febrile infectious diseases, or for prevention of pregnancy complications, and so on, and they may be administered orally or parenterally.

"Thiamine" in this specification means any of water-soluble acid salts of thiamine such as hydrochloride, sulfate and dinitrate.

What is claimed is:

1. A stabilized aqueous solution of vitamin B complex containing cyanocobalamin together with thiamine, niacinamide and a non-toxic amount of a water-soluble alkaline thiocyanate, and being free from ascorbic acid.

2. A stabilized aqueous solution of vitamin B complex containing cyanocobalamin together with thiamine and niacinamide and a non-toxic amount of potassium thiocyanate, and being free from ascorbic acid.

3. A stabilized aqueous solution of vitamin B complex containing cyanocobalamin together with thiamine and niacinamide and a non-toxic amount of sodium thiocyanate, and being free from ascorbic acid.

4. A stabilized aqueous solution of vitamin B complex containing cyanocobalamin together with thiamine and niacinamide and a non-toxic amount of ammonium thiocyanate, and being free from ascorbic acid.

5. A stabilized aqueous solution of vitamin B complex consisting essentially of thiamine, niacinamide and a non-toxic amount of a water-soluble alkaline thiocyanate.

6. A stabilized aqueous solution consisting essentially of thiamine hydrochloride, niacinamide, cyanocobalamin, benzyl alcohol and a non-toxic amount of a water-soluble alkaline thiocyanate.

7. A stabilized aqueous solution consisting essentially of cyanocobalamin, thiamine hydrochloride, niacinamide, riboflavin monophosphate, pyridoxine hydrochloride, pantothenyl alcohol, benzyl alcohol and a non-toxic amount of a water soluble alkaline thiocyanate.

8. A stabilized aqueous solution consisting essentially of cyanocobalamin, thiamine hydrochloride, niacinamide, calcium pantothenate, pyridoxine hydrochloride, glycerin, flavors, a non-toxic amount of a water-soluble alkaline thiocyanate and dilute hydrochloric acid as a pH regulator.

No references cited.

UNITED STATES PATENT OFFICE
CERTIFICATION OF CORRECTION

November 8, 1960

Patent No. 2,959,520

Seizo Kawajiri

It is hereby certified that error appears in the above numbered patent requiring correction and that the said Letters Patent should read as corrected below.

Column 1, line 30, for "extistence" read -- existence --; column 2, TABLE 3, second column, under the heading "Concentration of KSCN, percent", lines 2 and 4 thereof, strike out the dotted lines and insert instead a dash in each occurrence.

Signed and sealed this 9th day of May 1961.

(SEAL)
Attest:
ERNEST W. SWIDER
Attesting Officer

DAVID L. LADD
Commissioner of Patents